United States Patent [19]

Kubicko et al.

[11] Patent Number: 4,838,152
[45] Date of Patent: Jun. 13, 1989

[54] AUTO-OFF COFFEE BREWING SYSTEM

[75] Inventors: Robert E. Kubicko, Shelton, Conn.; Gregory E. Moores, Reisterstown, Md.; William H. Younger, Huntington, Conn.

[73] Assignee: Black & Decker, Towson, Md.

[21] Appl. No.: 222,195

[22] Filed: Jul. 21, 1988

[51] Int. Cl.⁴ ............................................. A47J 31/00
[52] U.S. Cl. ...................................... 99/280; 99/285; 219/308
[58] Field of Search ................. 99/279, 280, 281, 282, 99/283, 295, 285, 299, 300, 302 R, 304, 305, 307; 426/433; 219/308, 309, 333

[56] References Cited

U.S. PATENT DOCUMENTS 4,169,978 10/1979 Hauslein ............................. 99/281

Primary Examiner—Robert W. Jenkins
Attorney, Agent, or Firm—Perman & Green

[57] ABSTRACT

A coffee brewing machine utilizes an insulated carafe to receive the brewed coffee and automatically turns itself off a short time after completion of a brew cycle. The machine also turns off automatically a specified time after a brew cycle is initiated when calcification is so extreme that flow of water through the unit is totally prevented. Additionally, as a safety feature, the system also turns off automatically in the case of a "dry run", that is, a short specified time after accidental energization when no water is in the reservoir. A lamp is lighted when a brew cycle is in progress but is extinguished at other times.

20 Claims, 4 Drawing Sheets

AUTO-OFF COFFEE BREWING SYSTEM

BACKGROUND OF THE INVENTION

1. Field of the Invention

The present invention relates generally to a coffee brewing system which utilizes an insulated carafe to receive brewed coffee and automatically turns itself off under appropriate conditions.

2. Description of the Prior Art

In the past, coffee brewing systems intended for domestic use have customarily been equipped with uninsulated receptacles to receive the brewed coffee. These systems typically provide a heater plate on which the receptacle is supported after completion of the brew cycle. The purpose of the heater plate is to keep the coffee warm until it is completely consumed or discarded. However, such an arrangement is costly in that it requires the continued expenditure of power. It also heats the environment which is doubly costly when the room in which the system is located is air conditioned. Such continued heating of coffee also detracts from its flavor when the time period is an extended one. Additionally, drippage of coffee is often known to occur onto the heater plate. This causes burning of the coffee on the heater plate, customarily leaving an unpleasant hardened residue which can subsequently become transferred to the receptacle. Eventually, it becomes necessary to clean the surfaces of both the heater plate and the bottom of the receptacle.

Devices have previously been known for automatically turning off appliances at some desired time. One such invention is disclosed in U.S. Pat. No. 4,480,173 to Butterfield which describes a water heater in the nature of a pressure cooker. In the instance of that patent, a water level transducer controls a motorized inlet valve to close the valve when the water level in the tank reaches a predetermined level and opens the valve when the water falls below that level. However, the Butterfield patent does not disclose a coffee brewing system and is not concerned with turning the heater off a predetermined time after a brew cycle intended to yield a predetermined amount of coffee has been accomplished. More directly concerned with coffee brewing processes are the U.S. Pat. Nos. 3,869,968 to Ihlenfeld and 3,759,161 to Anderson. In each instance, the patent discloses a cfffee brewer of a conventional type which utilizes a heater plate to maintain the temperature of the brewed coffee in the coffee pot after completion of a brew cycle. In each instance, provision is made for deenergizing the heater mechanism used in the brewing operation, while continuing to energize the auxiliary heater mechanism used to maintain the temperature of the brewed coffee.

SUMMARY OF THE INVENTION

It was with knowledge of the prior art as generally represented by the patents just discussed, and their drawbacks which gave rise to the present invention. The present invention is directed towards a coffee brewing system which utilizes an insulated carafe to receive the brewed coffee. According to the invention, the system automatically turns itself off a short time after completion of a brew cycle. It also turns off automatically a specified time after a brew cycle is initiated when calcification is so extreme that flow of water through the unit is totally prevented. Additionally, as a safety feature, the system also turns off automatically in the case of a "dry run", that is, a short specified time after accidental energization when no water is in the reservoir. A lamp is lighted when a brew cycle is in progress but it is extinguished at other times.

The brewing system of the invention employs a water reservoir of finite capacity which is filled to a preselected level to achieve the number of brewed cups desired by the user. A water supply conduit extends between the reservoir and a brewing station comprised of a brew basket supporting a filter into which a desired quantity of ground coffee is placed. A first electrically energizable heat generator is provided for heating the water in the supply conduit to a sufficient extent as it flows from the reservoir to the brewing station to enable coffee to be brewed at the brewing station. During normal operation, the reservoir is substantially depleted of water at the end of a complete brew cycle. A first automatic thermostat in heat exchange relationship with the first heat generator is operable to control the temperature thereof. Biased to a closed position to energize the first heat generator, the first thermostat is automatically movable to an open position to deenergize the first heat generator when its temperature exceeds a predetermined value.

The invention also utilizes a second electrically energizable heat generator which is responsive to operation of the first thermostat for generating heat when the first thermostat is in the open position and non functioning when the first thermostat is in the closed position. A manual reset, or second, thermostat in heat exchange relationship with the second heat generator is selectively movable to a closed position enabling the first heat generator to continue to be energized when the automatic thermostat is open. However, subsequently, a predetermined period of time after water ceases to flow through the supply conduit, the second thermostat moves to an open position to deenergize the first heat generator.

It is noteworthy that water may cease to flow through the supply conduit either after completion of the brew cycle or when mineral deposits in the supply conduit build up to such an extent that water can no longer flow between the reservoir and the brew station. In the course of operation of the brewing system, it is normal for mineral deposits to form in the supply conduit. While it is desirable to clean the supply conduit periodically, it is not the intent of the system of the present invention to penalize the user for failure to regularly clean the system. That is, the system will continue to operate even though there has been some mineral build up which reduces the flow rate of water between the reservoir and the brew station and which therefore results in a longer brew cycle than when there were no deposits in the conduit. However, when the deposits build to such an extent that water can no longer pass through the conduit, for reasons of safety it is necessary to turn the machine off and the invention is operable for that purpose.

Thus, as mineral deposits, often times referred to as "calcification" becomes more aggravated, the automatic, or first, thermostat is caused to open and close intermittently. That is, as heat builds up in the first heat generator because of reduced coolant (that is, water) flow rate, the automatic thermostat opens, but then subsequently closes again because of the continued passage through the supply conduit of fresh cool water. This process continues until all of the water in the reservoir has become depleted at which time the automatic thermostat opens and remains open for an extended duration since the heat transfer capability of air is far less than that of water. After the automatic thermostat has remained open for a predetermined period of time, the manual reset, or second, thermostat is likewise caused to open because of extended heating of the second heat generator and remains open until it is manually reset at some subsequent time.

During the time that a brew cycle is in progress, an indicator in the form of a neon lamp is lighted but becomes extinguished either when the brew cycle is completed or when the system becomes deenergized because of an extreme mineral build up in the supply conduit. In short, the indicator is extinguished only when the manual thermostat opens.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate one of the embodiments of the invention and, together with the description, serve to explain the principles of the invention in general terms.

DESCRIPTION OF THE PREFERRED EMBODIMENT

Figure 1:
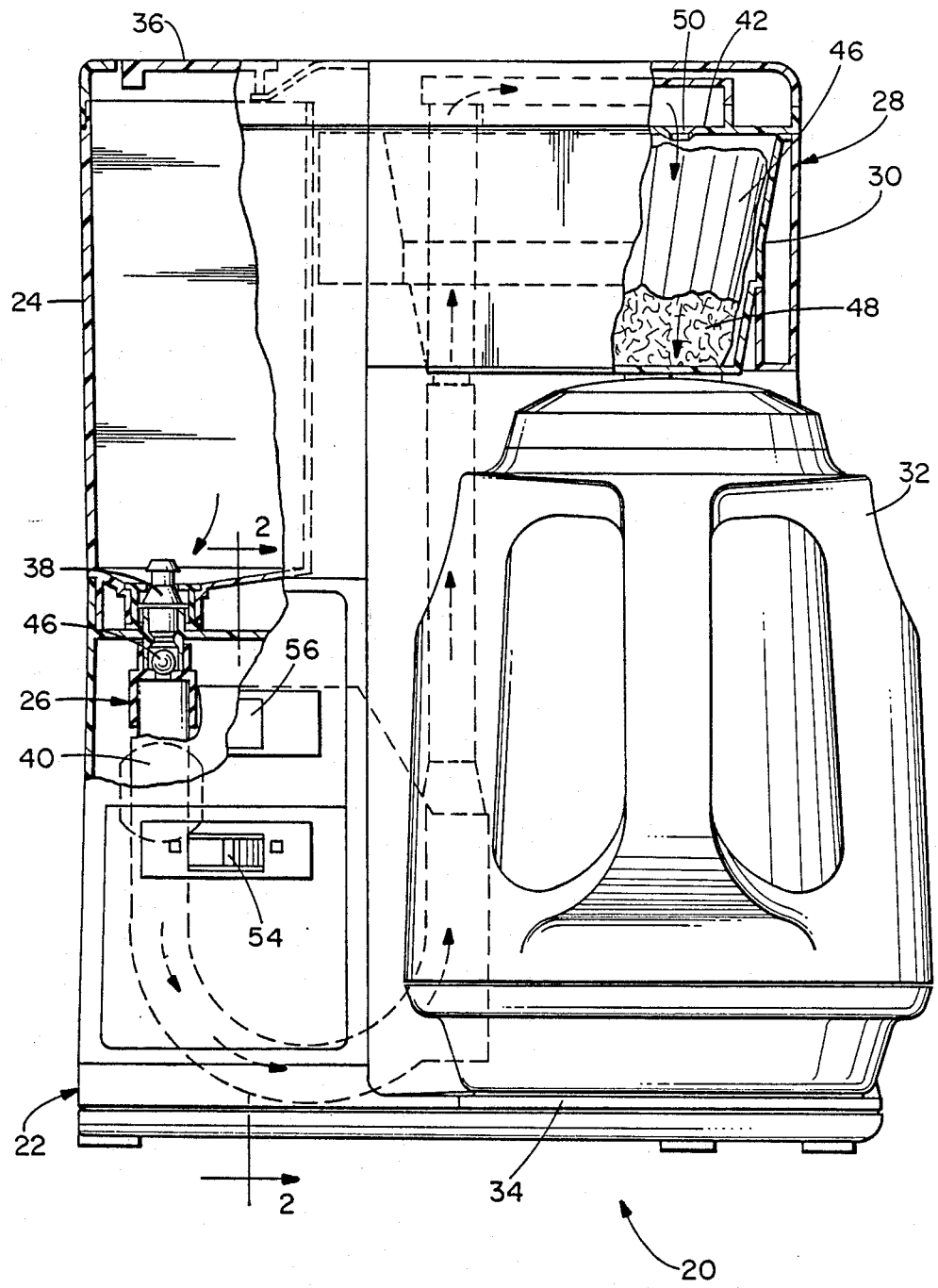
FIG. 1 is a front elevation view illustrating an automatic coffee brewing machine which embodies the present invention, certain parts being cut away and shown in section.
Figure 2:
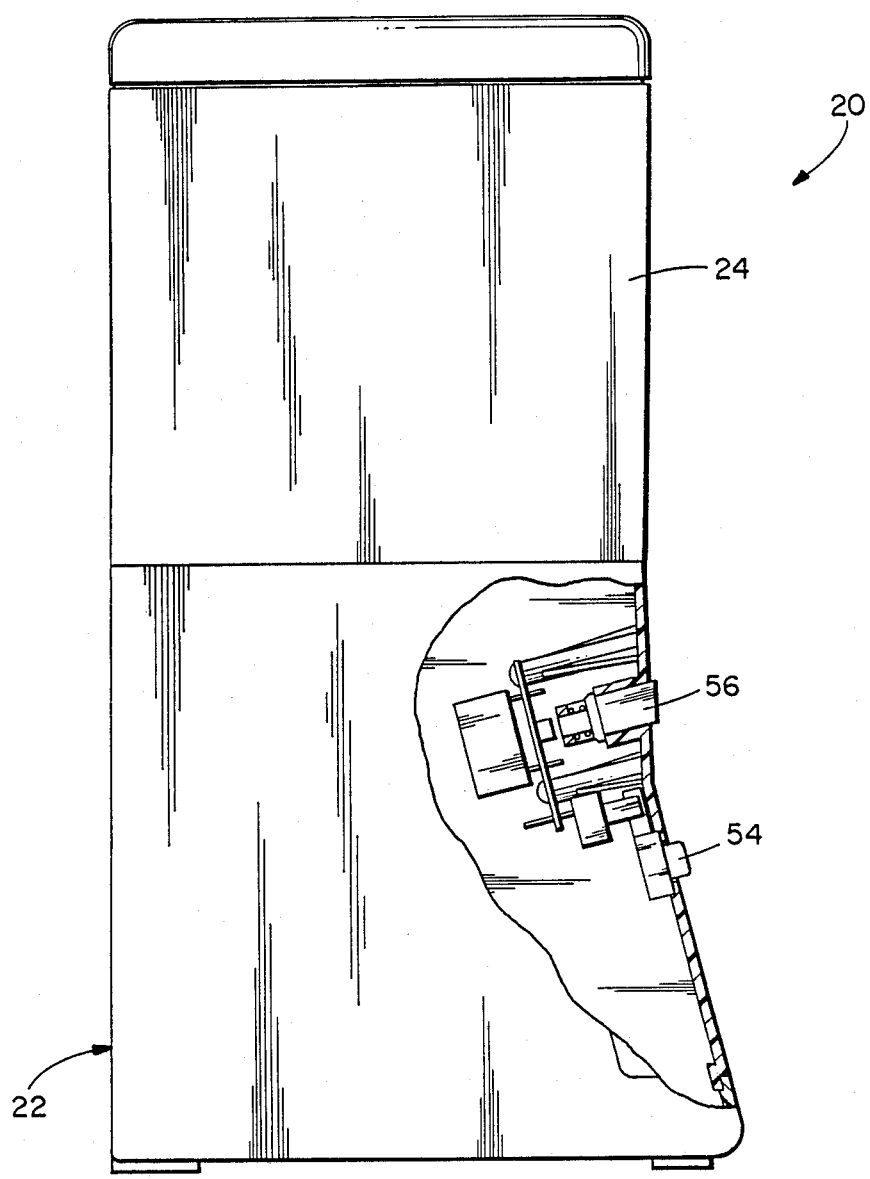
FIG. 2 is a side elevation view of the coffee brewing machine illustrated in FIG. 1, certain parts also being cut away and shown in section.

Turn now to the drawings and, initially, to FIGS. 1 and 2 which illustrate an automatic coffee brewing machine 20 which embodies the present invention. The machine 20 includes a main housing 22 adapted to rest on a counter or other convenient location. The housing 22 contains all of the necessary components for brewing coffee, specifically, a self contained water reservoir 24, a water heating and pumping system 26, and a brewing station 28 including a coffee basket 30.

A receptacle 32 for receiving brewed coffee is preferably in the form of an insulated carafe which is an independent component of the brewing machine 20. It is noteworthy that when the carafe assumes the coffee receiving position indicated in FIG. 1, it rests on a support plate 34 which is an integral part of the main housing 22 but is not heated in the manner of many, if not most, of the domestic brewing machines currently being sold. Being insulated, the carafe 32 retains the warmth and flavor of the coffee for a long period of time without requiring continued heating after the brewing process has been completed.

The water reservoir 24 is self contained and may be filled by way of a lid 36 which can be suitably pivoted between open and closed positions. The reservoir itself may be removable from the remainder of the housing 22 for purposes of cleaning or to enable it to be filled from a faucet with an amount of water equivalent to the number of cups of coffee desired. When the water reservoir 24 is returned and reattached to the housing 22, a valve 38 biased closed when the reservoir is removed from the housing is again opened and enables the water in the reservoir to enter the system.

The water heating and pumping system 26 includes a water supply conduit 40 which extends generally between the water reservoir and the brewing station 28. As indicated by dashed lines in FIG. 1, the water supply conduit 40 first descends from the reservoir, then reverses direction to ascend from the base region of the machine 20, making connection with a shower plate 42 which overlies the coffee basket 30. The system 26 also includes an electrically energizable hot water generator 44 (FIG. 3) which operates in a known manner for heating the water in the supply conduit to a sufficient extent as it flows from the reservoir 24 to the brewing station 28 to enable coffee to be brewed at the brewing station.

In the general operation of the machine 20, in a known manner, water flows from the reservoir 24, first descending, then ascending toward the shower plate 42, its ascension being caused by the hot water generator 44. Thereafter, with the aid of a check ball 46 which operates to close the water supply conduit 40 at its entrance end, the resulting water and steam mixture rises through the ascending portion of the conduit 40 to the shower plate 42. Also in a known manner, a filter 46 of paper or other suitable material is positioned in the coffee basket 30 to receive fresh ground coffee 48. The hot water pumped by the generator 44 passes through a plurality of suitably positioned openings 50 in the shower plate 42 onto and through the ground coffee 48 and filter 46 for eventual reception by the carafe 32 when positioned to receive brewed coffee from the coffee basket (FIG. 1).

Figure 3:
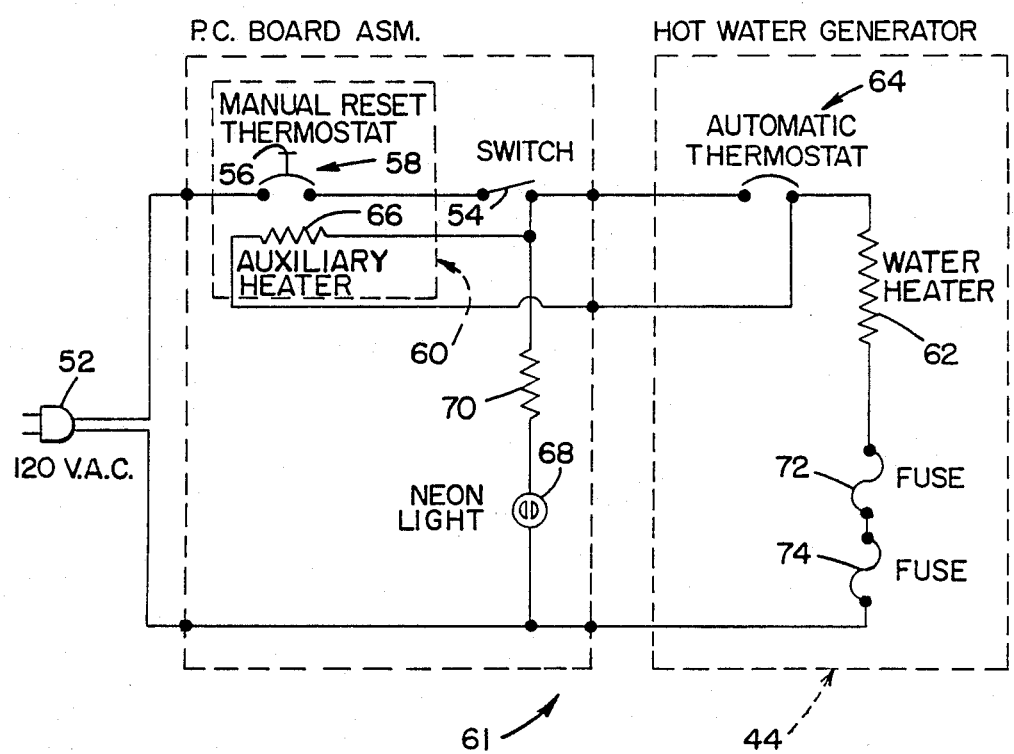
FIG. 3 is a schematic drawing of an electrical circuit for operating the coffee brewing machine illustrated in FIGS. 1 and 2.

As illustrated in FIG. 3, the coffee brewing machine 20 is AC powered as represented by a plug 52 which can be connected in a customary manner to a 120 VAC outlet receptacle. A main off-on switch 54 (FIGS. 1-3) is operated in order to enable operation of the machine 20 to proceed. However, an actual brewing cycle will not commence until a reset button 56 associated with a manual reset thermostat 58 has also been actuated. The manual reset thermostat 58 is one component of a thermal relay 60 of a type which is commercially available, one such device suitable for purposes of the invention being Model 607 TDR manufactured by Texas Instruments, Inc. of Versailles, Kentucky.

A primary feature of the coffee brewing machine 20 resides in its ability to turn off its operating mechanism when it determines that flow of water through the supply conduit 40 is non existent. Such a situation may occur in the first instance if the user fails to put water in the reservoir 24. It also occurs at the end of a complete brew cycle. Finally, it additionally occurs at such time that the supply conduit 40 becomes so calcified that water can no longer pass through from the reservoir 24 to the brewing station 28. An electrical circuit 61, schematically presented in FIG. 3, enables normal operation of the brewing machine 20 but has the added ability of turning the machine off automatically after the occurrence of any of these events.

Thus, as seen in FIG. 3, the hot water generator 44 includes a water heater 62 with a high power output, typically 975 to 1000 watts and therefore exhibiting a relatively low resistance value, typically 14 ohms. The source of power, as represented by the plug 52, and the switches 54 and 58 are all electrically in series with the water heater 62 as is an automatic thermostat 64 associated with the water heater. The switch contacts of the automatic thermostat 64 are normally biased to a closed position which has the effect of energizing the water heater 62 when the switches 54 and 58 are closed. However, the thermostat 64 is caused to open when the temperature of the water heater exceeds a predetermined magnitude. The temperature of the water heater exceeds such a predetermined magnitude in each of the instances mentioned above, namely, when there is a lack of flow of water through the conduit 40 either for lack of water initially in the reservoir or because a brew cycle has been completed, or when calcification of the supply conduit is so great that water is unable to flow. In the instance in which there is water flow, but because of some amount of calcification in the supply conduit 40, the flow rate is reduced, the thermostat is caused to cycle between open and closed positions. That is, heat builds up in the hot water generator 44 to the extent that the thermostat opens, but because water flow continues, albeit at a reduced rate, the outer structural components of the water generator are caused to cool down permitting the contacts of the thermostat to close once again to thereby once again energize the water heater.

Figure 4:
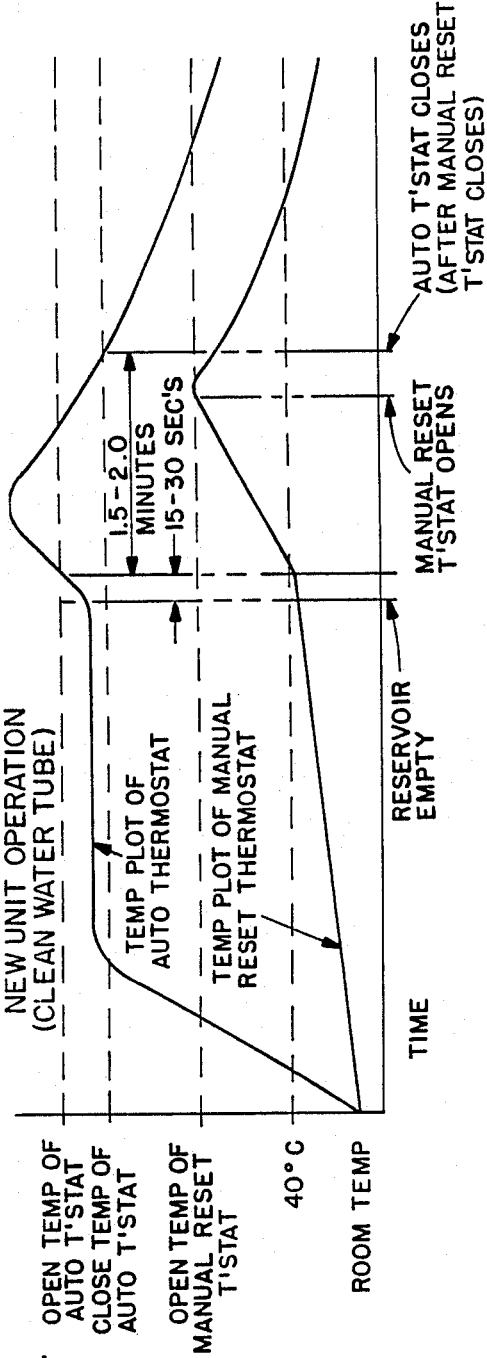
FIG. 4 is a time versus temperature diagram illustrating the operation of the coffee brewing machine of the invention when the supply conduit is totally clean.
Figure 5:
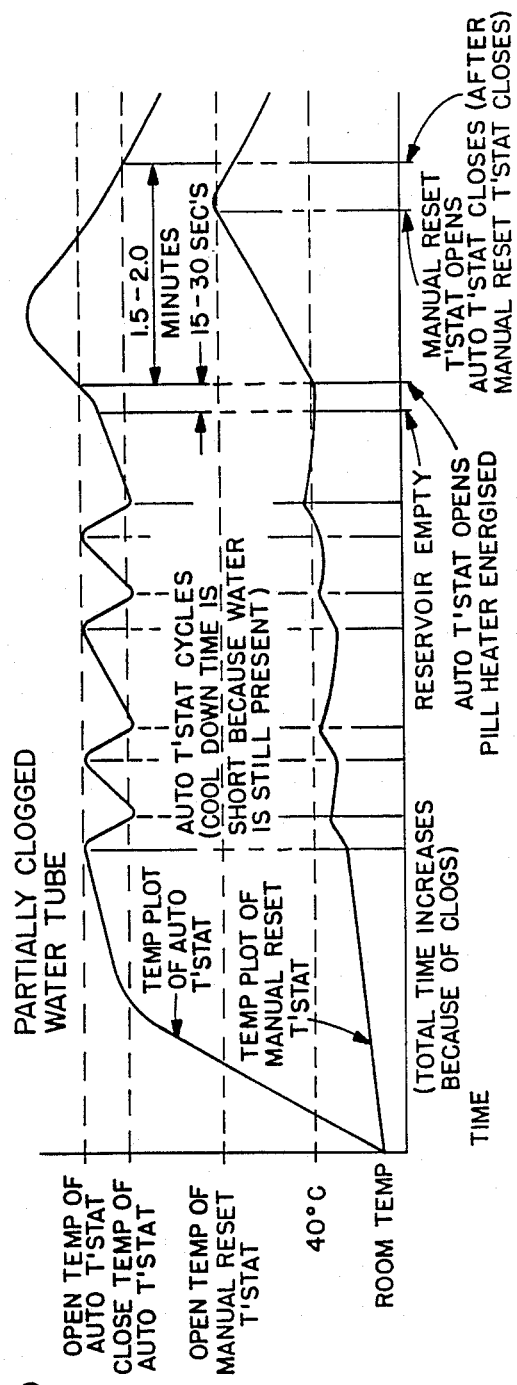
FIG. 5 is a time versus temperature diagram, similar to FIG. 4, illustrating the operation of the coffee brewing machine when it has a partially calcifed supply conduit.

FIG. 4 is a time versus temperature diagram which illustrates the operation of the brewing machine 20 when the supply conduit 40 is totally clean. FIG. 5, in contrast, is a time versus temperature diagram illustrating the operation of the brewing machine when it has a partially calcified supply conduit.

While the hot water generator 44 has provision, as described, for preventing the water heater 62 from overheating, it, by itself, has no capability for turning off the machine upon the occurrence of any of the events previously mentioned. However, the thermal relay 60 when utilized in conjunction with the hot water generator 44 provides this desirable result. For this purpose, the thermal relay includes an auxiliary heater 66 which, in contrast to the water heater 62, is a lower power, typically 2 to 10 watts, high resistance, typically approximately 3000 ohms, device. The manual reset thermostat 58 is associated with the auxiliary heater 66 and is responsive to the auxiliary heater. That is, the contacts of the thermostat 58 are caused to open when the temperature resulting from the auxiliary heater 66 being energized reaches a predetermined level. It is highly desirable that the thermal relay 60 be thermally isolated from the heater 62 so that the thermostat 58 is subject only to heat from the auxiliary heater 66 and not substantially affected by heat from the water heater 62.

It will be noted, viewing FIG. 3, that the auxiliary heater 66 is electrically in parallel with the automatic thermostat 64. Thus, so long as the automatic thermostat remains closed, there will be substantially no current flow through the auxiliary heater 66 and, therefore, it will not be energized to any appreciable extent. However, at such time that the automatic thermostat 64 opens, the auxiliary heater 66 becomes energized. If it remains energized for a predetermined period of time, it causes the manual reset thermostat 58 to open and the latter will remain open until the reset button is again manually operated to close the contacts of the manual reset thermostat 58.

It will be appreciated that the operational characteristics of the automatic thermostat 64, manual reset thermostat 58, and auxiliary heater 66 are so chosen that an optimum operation of the brewing machine 20 will result.

Specifically, it would not be desirable for the manual reset thermostat 58 to open when the automatic thermostat 64 is cycling between its open and closed positions because of a partially calcified condition. However, in any of the other instances mentioned, it would be desirable for the manual reset thermostat to open after a predetermined period of time which will assure that, indeed, there is no water flow in the supply conduit 40, yet before any damage would occur to any of the components of the machine. A preferred duration for such a time delay would be in the range of one to two minutes after the automatic thermostat 64 has opened and remains open.

A neon lamp 68 and an associated protective resistor 70 are electrically in parallel with the other components illustrated in the circuit such that the lamp remains lighted to indicate that a brew cycle is under way so long as the main switch 54 is closed and the manual reset thermostat 58 is closed. When either of those switches is open, it is indicative of the fact that either a brew cycle has been completed, or has not yet begun. As a further safety feature, the circuit 61 in FIG. 3 includes a primary fuse 72 and a secondary fuse 74 which are electrically in series between the power source as represented by the plug 52 and the water heater 62. It is desirable that the fuses 72, 74 be of staggered rupture values within the range of safety so as to assure that both fuses could not originate from the same bad lot. This minimizes the possibility that a product failure would occur.

While the preferred embodiment of the invention has been disclosed in detail, it should be understood by those skilled in the art that various modifications may be made to the illustrated embodiment without departing from the scope as described in the specification and defined in the appended claims.

What is claimed is:

1. A coffee brewing machine comprising:
   a water reservoir of finite capacity;
   a brewing station;
   a water supply conduit in communication with and extending between said reservoir and said brewing station;
   a first electrically energizable heat generator intermediate said water reservoir and said brewing station for heating water in said water supply conduit to a sufficient extent as it flows from said reservoir to said brewing station to enable coffee to be brewed at said brewing station, said reservoir being substantially depleted of water at the end of a normal complete brew cycle;
   first and second temperature sensitive switches electrically in series with said first heat generator, said first switch being biased to a closed position and responsive to the temperature at said first heat generator and automatically movable to an open position when the temperature at said first heat generator exceeds a predetermined magnitude and automatically returning to a closed position when the temperature at said first heat generator falls below said predetermined magnitude by reason of the cooling effect of the continued flow of water through said supply conduit; and a second heat generator associated with said second switch electrically in parallel with said first switch and operable to generate heat upon opening of said first switch, said second switch being responsive to operation of said second heat generator to open if, after a predetermined lapse of time, said first switch is also open, a condition indicative of the absence of the flow of water through said supply conduit.

2. A coffee brewing machine as set forth in claim 1 including:

indicator means for indicating that a brew cycle is in progress so long as said second switch remains in the closed position.

3. A coffee brewing machine as set forth in claim 2 wherein said indicator means is a neon lamp electrically in series with said second switch.

4. A coffee brewing machine as set forth in claim 1 wherein said second heat generator is substantially thermally isolated from said first heat generator.

5. A coffee brewing machine as set forth in claim 1 wherein said second switch includes a reset button for selectively moving said second switch to the closed position.

6. A coffee brewing machine comprising:

a water reservoir of finite capacity;

a brewing station;

a water supply conduit in communication with and extending between said reservoir and said brewing station;

a first electrically energizable heat generator intermediate said water reservoir and said brewing station for heating water in said water supply conduit to a sufficient extent as it flows from said reservoir to said brewing station to enable coffee to be brewed at said brewing station, said reservoir being substantially depleted of water at the end of a normal complete brew cycle;

a first thermostat in heat exchange relationship with said first heat generator operable to control the temperature thereof, said first thermostat biased to a closed position to energize said first heat generator but movable to an open position to deenergize said first heat generator when the temperature thereof exceeds a predetermined value;

a second electrically energizable heat generator responsive to operation of said first thermostat for generating heat when said first thermostat is in said open position and nonfunctioning when said first thermostat is in said closed position; and a manual reset thermostat in heat exchange relationship with said second heat generator and movable between a closed position for energizing said first heat generator when said first thermostat is closed and an open position to deenergize said first heat generator a predetermined period of time after water ceases to flow through said supply conduit.

7. A coffee brewing machine as set forth in claim 6 wherein said first thermostat is automatic such that, upon the formation of mineral deposits within said supply conduit, said first thermostat is caused to open and close intermittently so long as water continues to flow through said supply conduit and is caused to open and remain open so long as said manual reset thermostat is closed and water ceases to flow through said supply conduit; and wherein said manual reset thermostat, in response to the heat produced by said second heat generator, is caused to open said predetermined time after said automatic thermostat opens and remains open.

8. A coffee brewing machine as set forth in claim 7 including:

indicator means for indicating that a brew cycle is in progress so long as said manual reset thermostat remains in the closed position.

9. A coffee brewing machine as set forth in claim 8 wherein said indicator means is a neon lamp electrically in series with said manual reset thermostat.

10. A coffee brewing machine as set forth in claim 7 wherein said automatic thermostat and said manual reset thermostat are both electrically in series with said first heat generator.

11. A coffee brewing machine as set forth in claim 6 wherein said second heat generator is substantially thermally isolated from said first heat generator.

12. A coffee brewing machine as set forth in claim 6 wherein said manual reset thermostat includes a reset button for selectively moving said manual reset thermostat to the closed position.

13. An electrically operated coffee brewing system for selective connecton to a source of electrical power comprising:

a water reservoir of finite capacity;

a brewing station from which brewed coffee can be delivered to an insulated receptacle;

a water supply conduit in communication with and extending between said reservoir and said brewing station;

an electrically energizable heat generator intermediate said water reservoir and said brewing station for heating water in said water supply conduit to a sufficient extent as it flows from said reservoir to said brewing station to enable coffee to be brewed at said brewing station, said reservoir being substantially depleted of water at the end of a normal complete brew cycle; and interruption means for deenergizing said coffee brewing system including said heat generator a predetermined time after water ceases to flow through said supply conduit wherein said interruption means includes:

sensing means operable for detecting the absence of water in said supply conduit;

first switch means movable between a closed position for electrically energizing said heat generator and an open position for deenergizing said heat generator, said switch means being biased to a closed position and responsive to operation of said sensing means to move to said open position; and second switch means operatively associated with said first switch means movable from a closed position for electrically energizing said brewing system from the source of electrical power to an open position disconnecting said brewing system from the source of electrical power when said first switch means has remained open for a predetermined time period.

14. An electrically operated coffee brewing system comprising:

a water reservoir of finite capacity;

a brewing station from which brewed coffee can be delivered to an insulated receptacle;

a water supply conduit in communication with and extending between said reservoir and said brewing station;

an electrically energizable heat generator intermediate said water reservoir and said brewing station for heating water in said water supply conduit to a sufficient extent as it flows from said reservoir to said brewing station to enable coffee to be brewed at said brewing station, said reservoir being substantially depleted of water at the end of a normal complete brew cycle; and interruption means for deenergizing said coffee brewing system including said heat generator a predetermined time after water ceases to flow through said supply conduit wherein said interruption means includes:

an automatic thermostat in heat exchange relationship with said heat generator operable to control the temperature thereof, said heat generator being a primary heat generator, said automatic therostate biased to a closed position to energize said first heat generator but movable to an open position to deenergize said first heat generator when the temperature thereof exceeds a predetermind value;

an auxiliary electrically energizable heat generator responsive to operation of said automatic thermostat for generating heat when said automatic thermostat is in said open position and nonfunctioning when said automatic thermostat is in said closed position; and a manual reset thermostat in heat exchange relationship wtih said auxiliary heat generator and movable between a closed position for energizing said primary heat generator when said automatic said primary heat generator when said automatic thermostat is closed and an open position to deenergize said primary heat generator a predetermined period of time after water ceases to flow through said supply conduit.

15. A coffee brewing system as set forth in claim 14 including:

indicator means for indicating that a brew cycle is in progress so long as said manual reset thermostat remains in the closed position.

16. A coffee brewing system as set forth in claim 15 wherein said indicator means is a neon lamp electrically in series with said manual reset thermostat.

17. A coffee brewing system as set forth in claim 14, wherein said automatic thermostat and said manual reset thermostat are both electrically in series with said first heat generator.

18. A coffee brewing machine as set forth in claim 14 wherein said auxiliary heat generator is substantially thermally isolated from said first heat generator.

19. A coffee brewing machine as set forth in claim 14 wherein said manual reset thermostat includes a reset button for selectively moving said manual reset thermostat to the closed position.

20. A coffee brewing machine as set forth in claim 14 wherein said heat generator is of a substantially greater power rating than said auxiliary heat generator.

* * * * *